UNITED STATES PATENT OFFICE.

CHARLES JOVIGNOT, OF PARIS, FRANCE.

COMPOSITION FOR USE IN HERMETICALLY CLOSING VESSELS.

No. 920,959.　　　　Specification of Letters Patent.　　　Patented May 11, 1909.

Application filed July 20, 1906. Serial No. 327,101.

*To all whom it may concern:*

Be it known that I, CHARLES JOVIGNOT, citizen of France, residing at 34 Avenue de l'Observatoire, Paris, France, have invented new and useful Improvements in Hermetically Closing Vessels, of which the following is a specification.

This invention relates to a composition adapted to be applied on vessels to hermetically close same.

This composition has for a base casein or its derivatives. Acids and fatty substances have no immediate or subsequent action on the composition, which keeps indefinitely and is unalterable by cold, moisture or heat. It is consequently of great utility for hermetically closing metal, glass, porcelain, or other vessels used for containing and preserving alimentary, chemical, pharmaceutical or other products which deteriorate by contact with air. It can be understood that this composition, on account of the special qualities above mentioned, is especially suitable for the purpose and gives the best results.

The new composition is prepared in the following manner: In a liter of hot water, 100 grams of phosphate of soda are dissolved and the hot solution thus made is gradually poured upon 200 grams of casein, to this is added 10 grams of fluorid of ammonia and 15 grams of glycerin. The whole is heated in a water bath of a temperature not exceeding 65 degrees centigrade until a homogeneous and consistent liquid is obtained. Generally on the surface of this liquid, especially if it cools, a film forms which it is best to remove before using the solution. The above proportions are given by way of example and may be modified according to circumstances. The solution thus prepared must be used hot. It is spread with a small brush or mechanically in the case of large quantities, on the interior edges of the cover of the vessels which is desired to be hermetically closed, or upon the part of the vessel to which the cover is to adhere.

The object or that part of it on which the composition has been spread, is dipped into a solution containing 10% of formic aldehyde, or this solution may be applied on the object by means of a small brush. This solution is adapted to harden the composition after it has been applied.

The solution prepared as set forth with phosphate of soda, casein, fluorid of ammonia and glycerin, would be too fluid to support the pressure with which the cover is applied upon the vessel, and would consequently run out of the edges of the cover. To avoid this, the solution is hardened after it is spread on the cover or vessel by dipping said cover or vessel in the solution of formic aldehyde. The solution is thus brought more or less to the hardness of india rubber which it is adapted to replace in making hermetic joints.

The cover of the vessel prepared or coated as described is applied and fixed on the body of the vessel by any suitable means.

Having now described my invention, what I claim as new and desire to secure by Letters Patent is:

1. A composition for hermetically closing vessels, consisting of phosphate of soda, casein, fluorid of ammonia, and glycerin in the proportions specified.

2. A composition for hermetically closing vessels consisting of phosphate of soda, casein, fluorid of ammonia and glycerin in the proportions specified and dipped into a solution of formic aldehyde.

In testimony whereof I have signed my name to this specification in the presence of two subscribing witnesses.

CHARLES JOVIGNOT.

Witnesses:
　　ANTOINE LAVOIX,
　　HANSON C. COXE.